United States Patent
Picard et al.

(10) Patent No.: US 11,258,618 B2
(45) Date of Patent: Feb. 22, 2022

(54) TURN ON METHOD WITHOUT POWER INTERRUPTION FOR REDUNDANT POWER OVER ETHERNET SYSTEMS

(71) Applicant: Texas Instruments Incorporated, Dallas, TX (US)

(72) Inventors: Jean Picard, Hooksett, NH (US); David N. Abramson, Hooksett, NH (US); Karl H. Jacobs, Hampton, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 141 days.

(21) Appl. No.: 16/460,570

(22) Filed: Jul. 2, 2019

(65) Prior Publication Data

US 2019/0327101 A1 Oct. 24, 2019

Related U.S. Application Data

(63) Continuation of application No. 15/228,338, filed on Aug. 4, 2016, now Pat. No. 10,389,539.
(Continued)

(51) Int. Cl.
*H04L 12/00* (2006.01)
*H04L 12/10* (2006.01)
(Continued)

(52) U.S. Cl.
CPC ............ *H04L 12/10* (2013.01); *G06F 1/263* (2013.01); *H02J 3/06* (2013.01); *H02J 4/00* (2013.01)

(58) Field of Classification Search
CPC .. H04L 12/10; G06F 1/263; H02J 3/06; H02J 4/00
See application file for complete search history.

(56) References Cited

U.S. PATENT DOCUMENTS 7,368,798 B2 * 5/2008 Camagna ................ G06F 1/266
257/499
7,492,059 B2 2/2009 Peker et al.
(Continued)

OTHER PUBLICATIONS

Rogachev et al., Texas Instruments, "Implementing a 60-W, End-to-End PoE System", Application Report, SLVA298, Feb. 2012.
(Continued)

*Primary Examiner* — Dinh T Le
(74) *Attorney, Agent, or Firm* — Michelle F. Murray; Charles A. Brill; Frank D. Cimino

(57) ABSTRACT

Disclosed examples include redundant Power over Ethernet (PoE) systems, powered device (PD) controllers and methods in which a first PD controller sends a signal to indicate to the other PD controllers that the first PD controller is powered, and a second PD controller newly connected or reconnected to a corresponding power sourcing equipment (PSE) refrains from turning off a shared DC-DC converter, and the second PD controller waits to allow an inrush current delay of the corresponding PSE to complete before allowing current flow between the DC-DC converter and the corresponding PSE, and the second PD controller selectively provides a signal to request an application circuit powered by the DC-DC converter to temporarily reduce its power consumption below a predetermined value if the corresponding PSE is configured to provide no more than the predetermined value of power.

18 Claims, 6 Drawing Sheets

Related U.S. Application Data

(60) Provisional application No. 62/206,682, filed on Aug. 18, 2015, provisional application No. 62/202,640, filed on Aug. 7, 2015.

(51) Int. Cl.
- *H02J 4/00* (2006.01)
- *H02J 3/06* (2006.01)
- *G06F 1/26* (2006.01)

(56) References Cited

U.S. PATENT DOCUMENTS

| | | | |
|---|---|---|---|
| 7,550,980 B2 | 6/2009 | Picard et al. | |
| 7,705,741 B2 | 4/2010 | Picard | |
| 8,045,602 B2 * | 10/2011 | Yu | H04B 3/54 375/222 |
| 8,549,331 B2 * | 10/2013 | Karam | H04L 1/22 713/300 |
| 8,754,542 B2 * | 6/2014 | Gammel | H02J 4/00 307/31 |
| 9,419,807 B2 | 8/2016 | Huff et al. | |
| 9,640,989 B2 * | 5/2017 | Ranzato | H02J 1/00 |
| 10,666,049 B2 * | 5/2020 | Vavilala | G06F 1/263 |
| 2003/0107269 A1 | 6/2003 | Jetzt | |
| 2005/0078700 A1 | 4/2005 | Thompson et al. | |
| 2006/0019629 A1 | 1/2006 | Berson et al. | |
| 2006/0082220 A1 | 4/2006 | Karam et al. | |
| 2006/0215680 A1 | 9/2006 | Camagna | |
| 2006/0218418 A1 | 9/2006 | Camagna et al. | |
| 2006/0218421 A1 | 9/2006 | Camagna et al. | |
| 2006/0238250 A1 | 10/2006 | Camagna et al. | |
| 2006/0273661 A1 | 12/2006 | Toebes et al. | |
| 2007/0177411 A1 | 8/2007 | Picard | |
| 2013/0219195 A1 | 8/2013 | Picard | |

OTHER PUBLICATIONS

Texas Instruments, "Quad IEEE 802.3at Power-Over Ethernet PSE Controller", TPS23851, SLUSAB3B, Sep. 2010, Revised Jun. 2013.
Texas Instruments, "Integrated 100-V IEEE 802.3af PD and DC/DC Controller", TPS23750, TPS23770, SLVS590—Jul. 2005, Revised Feb. 2008.

* cited by examiner

TURN ON METHOD WITHOUT POWER INTERRUPTION FOR REDUNDANT POWER OVER ETHERNET SYSTEMS

REFERENCE TO RELATED APPLICATION

Under 35 U.S.C. §§ 119-120, this continuation application claims benefits of and priority to U.S. patent application Ser. No. 15/228,338 (TI-76383), filed on Aug. 4, 2016, which claims priority to, and the benefit of, U.S. provisional patent application No. 62/202,640, entitled "TURN ON METHOD WITH NO POWER INTERRUPTION FOR REDUNDANT POE SYSTEM", filed on Aug. 7, 2015, and this application claims priority to, and the benefit of, U.S. provisional patent application No. 62/206,682, entitled "TURN ON METHOD WITH NO POWER INTERRUPTION FOR REDUNDANCY POE SYSTEM", filed on Aug. 18, 2015. The entirety of the above referenced applications are hereby incorporated herein by reference.

BACKGROUND

Power over Ethernet (PoE) technology facilitates provision of electrical power to one or more devices connected to a network, such as cameras and other audiovisual equipment, wireless access points, etc. The power sourcing equipment (PSE) provides power supply connection to one end of an Ethernet communication cable and the power-consuming or "powered" device (PD) is connected to the second end. PoE systems can also accommodate different load requirements. The supply and control of applied power in PoE systems is provided at the source end, commonly in an endspan Ethernet switch or an intervening (midspan) device, where the power sourcing equipment queries the powered device or devices and ensures that the load does not draw more power than is allowed. In certain situations, it is desirable to provide redundant PoE cables and associated power sourcing equipment for a given load to achieve power channel redundancy with no power interruption during any transition. The basic architecture uses two or more PoE inputs, each fed by a PSE port. Each input must draw enough current on its respective power feed to ensure the PSE power is maintained. One configuration uses a PD interface for each PoE input and a single shared DC-DC converter to provide continuous output power without interruption while PoE inputs are connected in any sequence and over any time interval. Redundant designs must therefore accommodate situations in which a PoE input is connected while another PoE input is already providing power to the load without disruption of output power. Conventional PoE operating procedures for powered device controllers are thus largely incompatible with desired redundant system operation in situations where one PSE port is providing power to a shared DC-DC converter and another PoE port is connected to a PSE.

SUMMARY

Disclosed examples include redundant Power over Ethernet systems, powered device (PD) controllers and methods in which operational PD controllers indicate to other PD controllers their powered state, and a PD controller that is newly connected or reconnected to a corresponding power sourcing equipment (PSE) refrains from turning off a shared DC-DC converter to mitigate disruption of load power. In addition, the recently connected PD controller waits to allow an inrush current delay of the corresponding PSE to complete before allowing current flow between the DC-DC converter and the corresponding PSE. The newly connected PD controller in certain examples selectively provides a signal to request an application circuit powered by the DC-DC converter to temporarily reduce its power consumption below a predetermined value if the corresponding PSE is configured to provide no more than the predetermined value of power.

DETAILED DESCRIPTION

Figure 1:
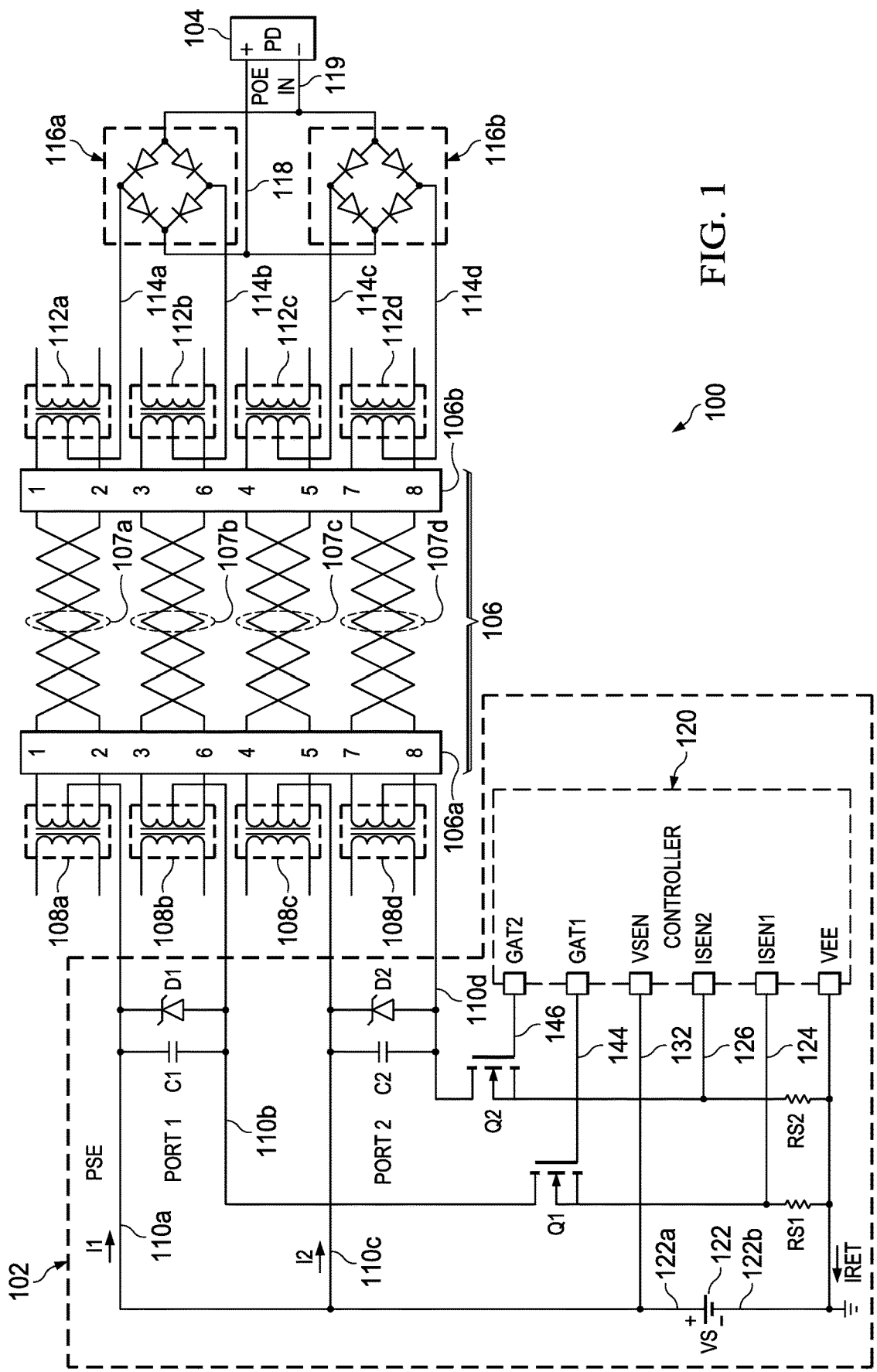
FIG. 1 is a schematic diagram illustrating a PSE in a redundant PoE communication system.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Figure 8:
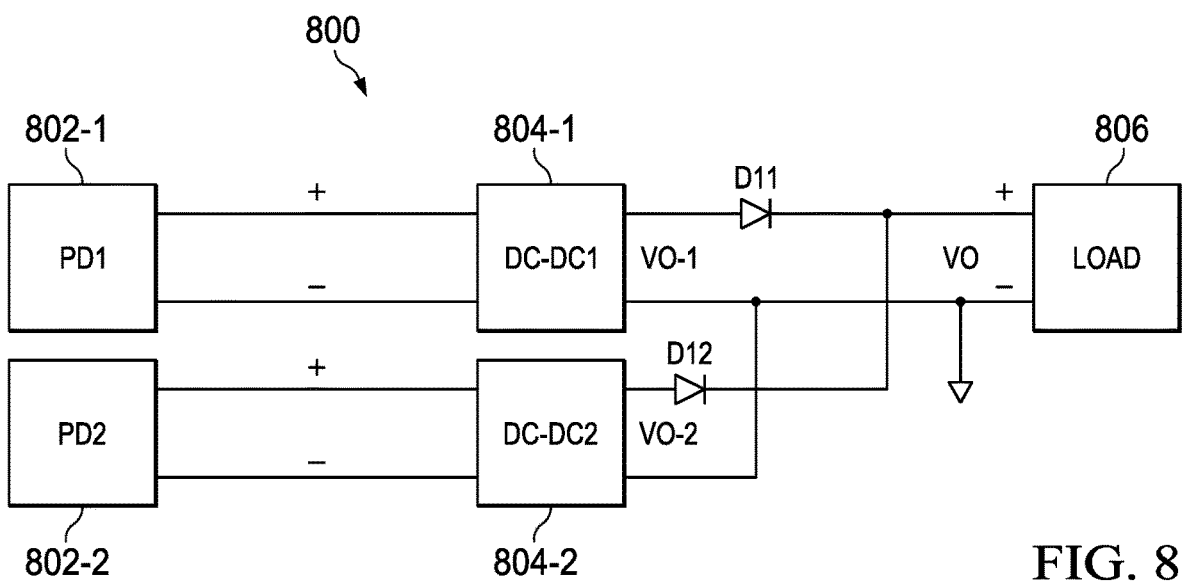
FIG. 8 is a schematic diagram of a redundant PoE system having multiple DC-DC converters.

Referring initially to FIG. 8, a redundant PoE system configuration 800 is illustrated, including first and second PD circuits 802-1 and 802-2, as well as corresponding first and second DC-DC converters 804-1 and 804-2. The outputs of the separate DC-DC converters 804 in FIG. 8 are connected together via auctioneering diodes D11 and the 12 to provide an output voltage VO to a load 806. The configuration of FIG. 8, however, requires separate DC-DC converters 804, and this architecture suffers from high cost and large area.

Figure 2:
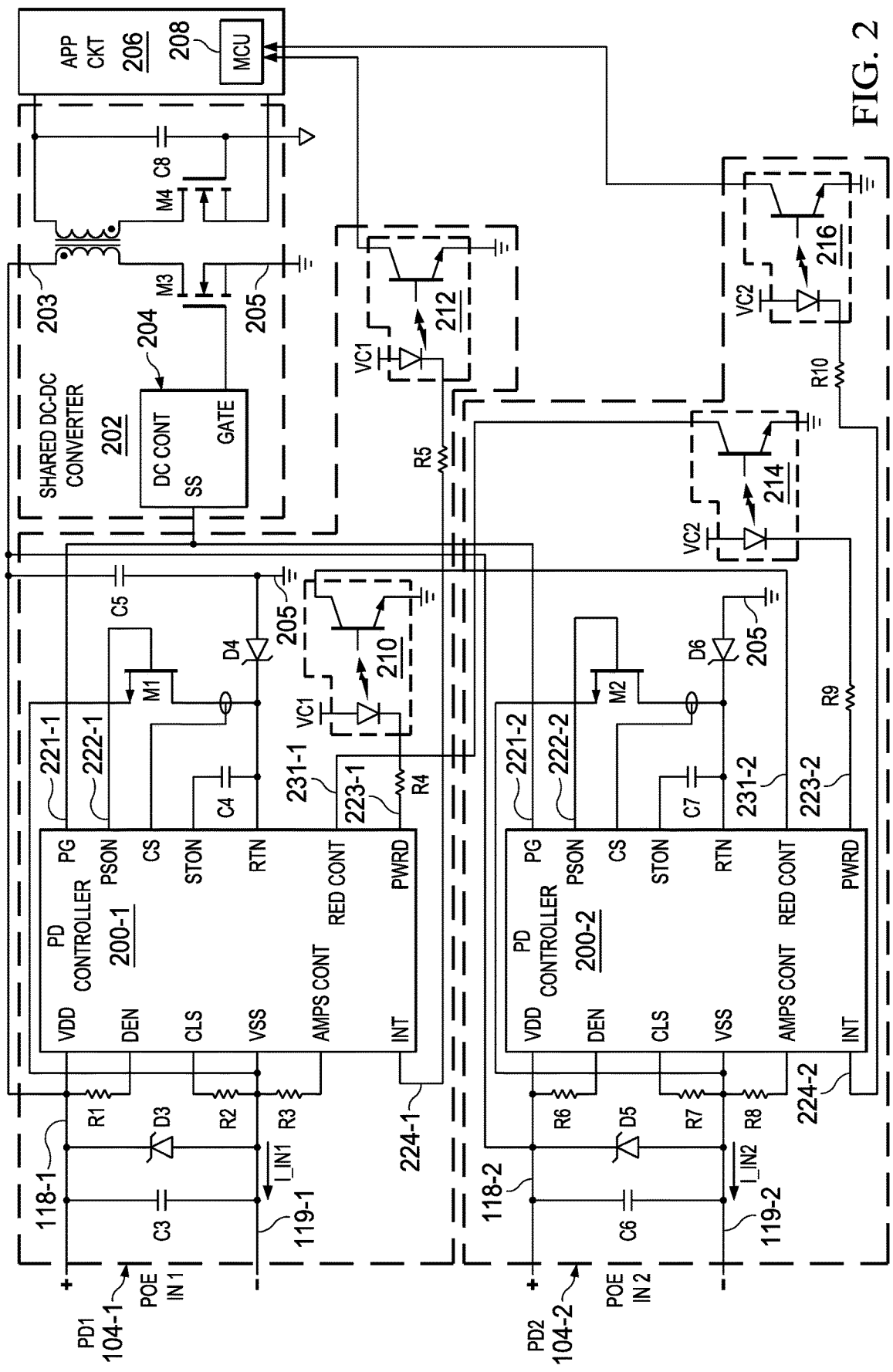
FIG. 2 is a schematic diagram illustrating two power devices with corresponding PD controllers and a shared DC-DC converter to power an application circuit load in the redundant PoE communication system.

FIGS. 1 and 2 show an improved redundant PoE system 100 for communications as well as power transfer through two or more communication cables 106. The system 100 includes multiple power sourcing equipment (PSE) circuits 102, one of which is shown in FIG. 1, as well as multiple powered device (PD) circuits 104 and a shared DC-DC converter 202 to supply power to a load, such as an application circuit 206 shown in FIG. 2. The system 100 uses a single DC-DC converter 202 and thus provides cost and space savings compared with the redundant PoE system 800 of FIG. 8. In operation, first and second PD circuits 104-1 and 104-2 in FIG. 2 are interconnected through PoE input ports PoE IN 1 and PoE IN 2 with corresponding PSE circuits 102, where the powered devices 104 connect the corresponding PSE power supplies with the input of the shared DC-DC converter 202. The system 100 uses a single (e.g., shared) DC-DC converter 202 to drive the application circuit load 206, and provides multiple PoE ports/PSE circuits for redundant provision of input power to the shared DC-DC converter. This redundancy facilitates continuous provision of output power to drive the application circuit 206. However, several challenges are presented by use of multiple PD circuits 104 with a single shared DC-DC converter 202. Accordingly, the PD circuits 104 in the system 100 use PD controllers or control circuits 200-1 and 200-2 in the respective PD circuits 104-1 and 104-2 with improved features to facilitate provision of continuous uninterrupted power to the application circuit load 206 using a shared DC-DC converter 202 as detailed below.

The PD circuits 104 are each interfaced with a corresponding PSE circuit 102 as shown in FIG. 1. Only one PSE circuit 102 is shown in FIG. 1. However, it will be appreciated that each of the PD circuits 104 in FIG. 2 is connected to a corresponding PSE circuit 102 through a separate cable. The PSE 102 in one example is operated by a PSE controller IC 120 that controls the provision of power to the corresponding powered device 104 through two ports (PORT 1 and PORT 2) of an Ethernet cable 106. The PSE circuit 102 in the example of FIG. 1 provides a separate rectifier circuit 116 for each port, and the output terminals 118, 119 of the rectifier circuits 116 are connected to one another to provide an input (labelled "POE IN" in the drawings) to a single PD circuit 104. In another example (not shown), each PSE circuit 102 is associated with a single port, and only includes a single rectifier circuit 116. In a redundant system, as shown in FIG. 2, multiple PSE circuits 102 are connected to corresponding PoE ports with corresponding powered device (PD) controllers 200. The PSEs 102 in a given redundant PoE system may, but need not be separately supplied. For example, two or more PSEs 102 can be housed in a single enclosure or box, and each PSE circuit 102 is connected to a corresponding PD circuit 104 by a separate cable. In addition, the PSE circuits 102 that are housed in a single enclosure or box may, but need not, share a common supply ground or reference potential. Although illustrated examples are described in the context of Power over Ethernet technology, various aspects of the present disclosure can be implemented in other forms or types of systems in which power is provided through a data cable.

The example Ethernet cable 106 in FIG. 1 includes first and second ends 106a and 106b having RJ-45 connectors, along with four wire pairs 107a, 107b, 107c and 107d individually extending between the cable ends 106a and 106b. Two communication ports are provided, for example, providing a transmit (TX) and receive (RX) communications via a corresponding set of two wire pairs 107, with PORT 1 using the first and second wire pairs 107a and 107b, and the second port PORT 2 using the third and fourth wire pairs 107c and 107d. Other embodiments may employ a single port or any suitable number of ports. The PSE 102 is electrically connected to the wire pairs 107a, 107b, 107c and 107d at the first end 106a of the connector 106 via center taps of corresponding data transformers 108a, 108b, 108c and 108d. The individual transformers 108 have primary windings for connection to a communication interface (not shown) as well as center-tapped secondary windings connected to the corresponding wire pair 107 of the cable 106.

The PSE 102 in FIG. 1 includes a power source 122 operatively coupled with the wire pairs 107 via connections 110a, 110b, 110c and 110d individually connected to the corresponding center taps of the data transformers 108a, 108b, 108c and 108d. The power source 122 in this example is a DC source with a first (e.g., positive) terminal 122a connected via connections 110a and 110c to the center taps of the first and third wire pairs 107a and 107c at the first end 106a to provide supply currents I1 and I2 to the first and second ports, respectively. A Zener diode D1 is coupled between the connections 100a and 100b along with a parallel capacitor C1, and a Zener diode D2 and a capacitor C2 are connected between the connections 100c and 100d.

Transformers 112a, 112b, 112c and 112d are provided on the powered device end 106b of the communication cable 106, having center-tapped secondary windings connected to the corresponding wire pairs 107a, 107b, 107c and 107d. The center taps of the transformers 112a and 112b are connected via connections 114a and 114b, respectively, as inputs to a diode bridge rectifier circuit 116a. Output terminals of the rectifier circuit 116a are connected via connections or lines 118 and 119 to positive and negative input terminals of the powered device 104. Similarly, power supplied to the second port of the cable 106 is brought from the center tap of the transformer 112c through connection 114c to an input terminal of a second diode bridge rectifier circuit 160b, and return current flows from the second input terminal of the rectifier circuit 116b through a connection 114d to the center tap of the transformer 112d. The output of the second rectifier circuit 116b is also connected via the connections 118 and 119 to the input of the powered device 104. In this configuration, the outputs of the rectifier circuits 116a and 160b are connected in parallel to power the powered device 104. Other configurations of one or more rectifier circuits 116 may be implemented on the second end of the communication cable 106 in various implementations.

A first switching device Q1 of the PSE 102 is connected in series with a first sense resistor RS1 between the return connection 110b and a second (negative) power source terminal 122b, and a second switching devices Q2 is connected with a second sense resistor RS2 between the return connection 110d and the negative power source terminal 122b. The switching devices Q1 and Q2 are NMOS transistors having drain terminals connected to the respective connections 110b and 110d and source terminals connected to the corresponding sense resistors RS1 and RS2. Other switching devices may be used, including without limitation MOS transistors, bipolar transistors, etc. The resistors RS1 and RS2 can be any suitable type, preferably of low impedance and high wattage rating (e.g., 0.5 Ω, 1.0 W). In other examples, sense FETs or other type of current sensors can be used. The switching devices Q1 and Q2 each include a gate control terminal to operate the corresponding switch in a first mode (ON or conductive) when the gate is in a first voltage range (e.g., HI) to allow the corresponding supply current I1, I2 to flow from the second, fourth wire pair 107b, 107d to the negative power source terminal 122b. The switches Q1 and Q2 are turned off (non-conductive) in a second mode when the corresponding gate terminal is in a second voltage range (e.g., LOW) to discontinue current flow from the cable 106 to the power source terminal 122b. When either or both port power circuits are operating (Q1 and/or Q2 ON), return current IRET flows into the second terminal 122b of the power source 122 as shown in FIG. 1.

Figure 4:
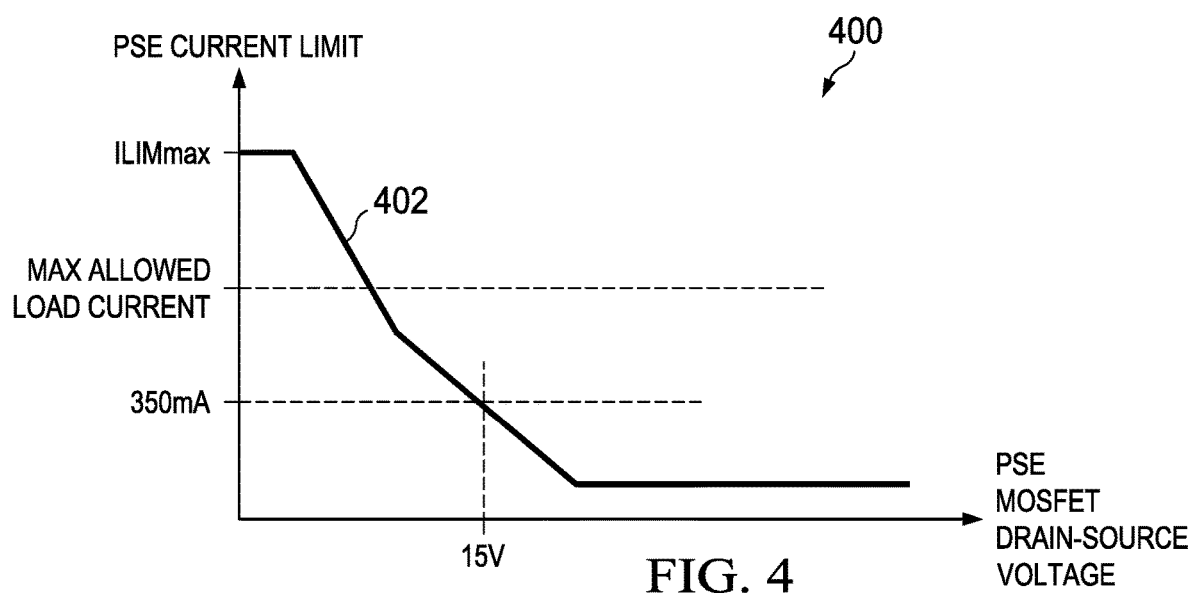
FIGS. 4 and 5 are signal diagrams illustrating two PSE current limit curves as a function of a PSE low side switch voltage.
Figure 5:
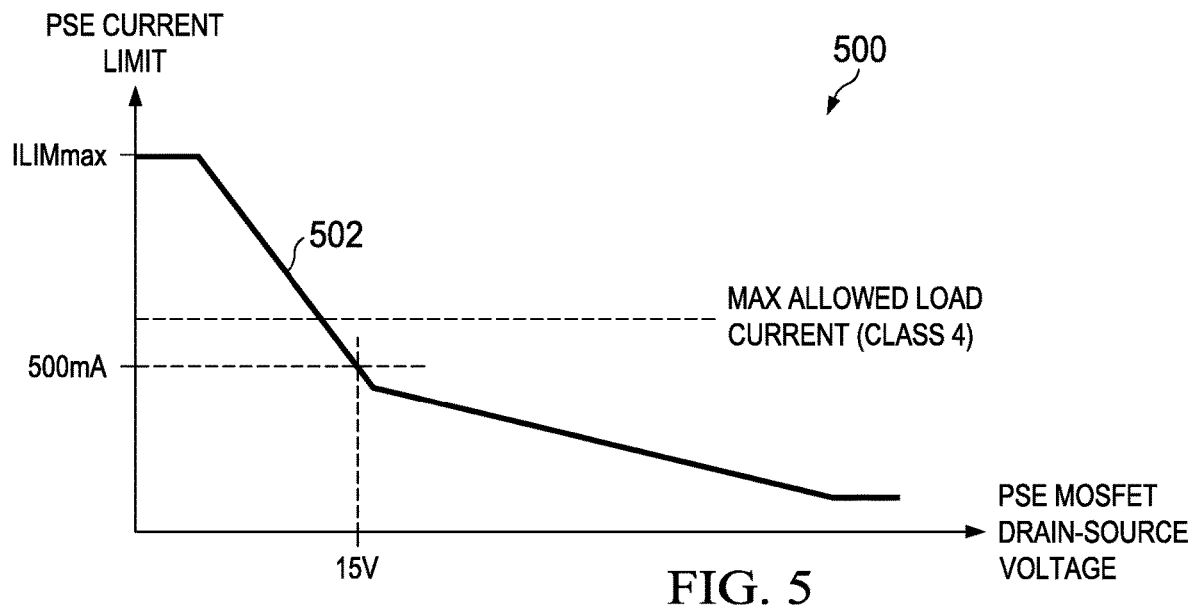

The power source 122 provides a supply voltage Vs between the terminals 122a and 122b and selectively provides a supply current I1 from the first terminal 122a to the first wire pair 107a when Q1 is ON, and provides supply current I2 to the third wire pair 107c when Q2 is ON. In certain implementations, multiple power sources can be provided in the power sourcing equipment 102, connected in parallel and/or in series with one another. Powered data cable systems may be rated for maximum power transfer between the power sourcing equipment 102 and the powered device 104. The power supplied via the power source 122 to one or both of the ports can be inhibited or fully discontinued by turning off the corresponding switch Q1 or Q2. The PSE 102 includes a PSE control circuit 120, implemented in some embodiments as a integrated circuit (IC) coupled with switch control output terminals 144 and 146 to provide a pair of switch control output signal GAT1 and GAT2 for selective operation of the switching devices Q1 and Q2, respectively. The switching control signals are provided by the controller 120 in either a first state (e.g., LOW in this example) to turn off a corresponding switching device Q1, Q2 or a second state (HI) to turn on the corresponding device Q1, Q2. In operation, the controlled operating states of the switching devices Q1 and Q2 may be implemented by provision of voltage signals within a particular range in order to turn the switching device on or off. The PSE controller circuit 120 in one example implements a foldback power (e.g., V×I) limit control function based on a sensed supply voltage input signal VSEN. In the illustrated example, the supply currents I1 and I2 are separately sensed via input terminals 124 and 126 receiving current sense input signals ISEN1 and ISEN2. In operation, the controller 120 turns off one or both of the switches Q1, Q2 in response to the sensed current exceeding a limit representing a continuous power limit for the PSE circuit 102. FIGS. 4 and 5 illustrate power limit control functions implemented as foldback current limit curves as a function of drain-source voltage of the PSE switching devices Q1 and Q2, as described further below.

FIG. 2 shows the PD and output side of the redundant PoE system 100. First and second PD circuits 104-1 and 104-2 are included in the system 100, each connected to the lines 118 and 119 of a corresponding PoE port for coupling to a corresponding PSE 102 as shown in FIG. 1. In other examples, any integer number N PD circuits 104 can be used, where N>1, each having connections to the shared DC-DC converter circuit 202. The first PD circuit 104-1 (e.g., PD1) includes an input capacitor C3 and a Zener diode D3 connected in parallel between the positive and negative power inputs 118-1 and 119-1, as well as a PD controller integrated circuit (IC) 200-1. The first PD controller 200-1 includes a positive supply input VDD connected to the first power input line 118-1, as well as a second supply input VSS connected to the negative power input 119-1. The PD controller 200-1 includes a device enable or detection input DEN used to disable the PD and make it so the PSE 102 cannot detect the PD. The PSE detects the presence of a connected cable 106. The PD circuit 104 can provides a resistance R1 (e.g., 25KΩ) connected between Vdd and DEN to allow the PSE to discover it. In operation, the PSE provides a low-voltage probe and detects the presence or absence of a connected PSE circuit 102 by measuring any resulting current through R1 in order to detect whether a valid PD controller 200 or PD circuit 104 is connected to the PSE 102. The first PD controller 200-1 also includes a classification (CLS) terminal for connection to the second power input 119-1 through a classification resistor R2. In addition, the PD controller IC 200-1 in this example also implements current limiting control, and includes a feedback terminal AMPS CONT connected to the second power input line 119-1 through a resistor R3. The PD controller 200-1 also includes a current sense input CS to sense or measure a current through a first power transistor M1.

A first output 221-1 of the PD controller 200-1 is connected to provide a power good output signal PG (e.g., a first output signal) to a soft start input SS of a DC controller 204 of the shared DC-DC converter circuit 202. The first PD circuit 104-1 also includes the first power transistor M1, in this case an N-channel MOSFET switch with a source coupled to the VSS controller input at the second power input 119-1, and a drain connected to a return input RTN of the PD controller IC 200-1. A current sensor in one example provides a signal to the CS input of the controller 200-1 indicating the drain current of M1. Any suitable current sensor can be used, such as a sense resistor, a sense FET, etc. A Schottky diode D4 includes an anode connected to a ground connection 205 of the shared DC-DC converter 202, and a cathode connected to the RTN input of the PD controller 200-1. A gate control terminal of the power transistor M1 is connected to a second output 222-1 of the PD controller 200-1. In FIG. 2, the power transistor M1 is external to the first PD controller IC 200-1. In other examples, the first power transistor M1 can be internal to the PD controller 200-1, with a source connected to the VSS terminal, a drain connected to the RTN terminal, and an internally controlled gate. In operation, the PD controller 200-1 selectively provides a power supply on signal PSON (e.g., a second output signal) to control the power transistor M1 to selectively control current flow between the DC-DC converter 202 and the corresponding PSE 102. The first PD controller IC 200-1 also includes a connection STON for coupling a capacitor C4 between the gate terminal of the power transistor M1 and the return input RTN. In one example, the STON terminal is coupled with the PSON terminal such that the capacitor C4 is connected to the gate of the corresponding power transistor M1 to control (e.g., slow down) the turn on speed of the power transistor M1.

As previously mentioned, a bulk capacitor or first capacitor C5 is coupled between a positive DC input terminal 203 of the shared DC-DC converter circuit 202, and the negative or ground connection 205 of the DC-DC converter 202. The first power input 118-1 of the first PD circuit 104-1 is connected to the positive DC input terminal 203 of the DC-DC converter circuit 202. Turning on M1 effectively provides a return current flow path between the DC-DC converter input ground connection 205 and the second power input 119-1 to allow a current I_IN1 to flow between the connected PSE circuit 102 and the input of the DC-DC converter 202. When powered, the DC-DC converter circuit 202 provides a DC output voltage to power and application circuit load 206. The load 206 can be any suitable powered device, such as an IP phone or other device that is powered via an Ethernet or other communication/supply system. The application circuit 206 includes communications interface circuitry (not shown) coupled with one or more of the data transformers 112 of the PoE system to communicate with another system through the cable 106. The illustrated DC-DC converter circuit 202 includes a transformer with a primary winding connected between the positive input line 203 and a primary side switch M3. A gate control output from the DC-DC controller 204 controls the switching operation of M3. A secondary winding of the transformer is connected between a positive DC output connection of the application circuit 206 and a secondary side (e.g., flyback)

transistor M4. Although the secondary circuit in the illustrated example provides a flyback converter configuration, other topologies can be used. The converter circuit 202 also includes an output capacitor C8 connected between the positive output and a ground or reference output connection to the application circuit 206. The application circuit in this example also includes a processor or MCU 208 implementing various functions including communication with the first and second PD circuits 104-1 and 104-2 as described further below.

The second PD circuit 104-2 also includes first and second power inputs 118-2 and 119-2 connected to a corresponding PoE input or port, along with an input capacitor and Zener diode C6 and D5, respectively. A resistor R6 is connected to the DEN terminal of a second PD controller IC 200-2 to allow detection of a valid connection between the second PD controller 200-2 and a corresponding PSE circuit 102. The CLS classification terminal of the PD controller 200-2 is connected to the second power input 119-2 through a classification resistor R7, and a resistor R8 connects the second power input 119-2 with the AMPS CONT terminal of the controller 200-2 to allow the PD controller IC 200 to generate minimum power supply (MPS) pulses as described further below in connection with FIG. 6. The second PD circuit 104-2 also includes a second power transistor M2 with a source connected to the second power input 119-2, a drain connected to the RTN terminal of the controller 200-2, and a gate control terminal connected to an output 222-2 of the controller 200-2 to receive a corresponding PSON signal. A capacitor C7 is connected between an STON terminal and the RTN terminal to optionally slow the turn on of the transistor M2. The second PD controller 200-2 also includes a first output 221-2 connected to the SS soft start input of the DC controller 204 to selectively control operation of the DC-DC converter circuit 202.

The power transistors M1 and M2 are controlled to selectively connect the respective VSS lines 119 of the associated PSE 102 to the return connection RTN of the controller ICs 200, which is connected to the DC-DC converter ground 205 through the corresponding Schottky diode D4, D6 to allow or prevent power transfer between the DC-DC converter 202 and the PSE circuit 102. The Schottky diodes D4 and D6 provide auctioneering between PSE1 and PSE2. In particular, if two PSEs 102 are provided from a common supply ground or reference voltage, D4 and D6 allow separation of the PD circuits 104-1 and 104-2 from the common connection to facilitate classification and identification. The power transistors M1 and M2 allow these separated circuits to be connected together once proper redundant supply operation is established. The PD controller ICs 200 provide the power supply on signals PSON at the outputs 222-1 and 222-2 to control the power transistors M1, M2 to selectively control current flow between the DC-DC converter 202 and the corresponding PSE circuits 102 via a connected communication cable 106.

In operation of a single PD circuit 104, during the inrush control phase, the controller 200 senses the return current via the voltage across a current sensing element, and turns the corresponding power transistor M1, M2 on at a controlled level to control inrush current for a predetermined time period to charge the bulk capacitor C5. The PSON control signal provides current limiting control functions and can operate to selectively disconnect the PSE return from the DC-DC converter ground 205 to interrupt or delay current flow between the DC-DC converter 202 and the communication cable 106. The controller 200 can also turn off the corresponding power transistor M1 or M2 when the PSE transistor drain-source voltage exceeds a predetermined value, e.g., 10-15 volts. During detection and class identification phases of startup, the PD controller 200 presents the class resistor R2, R6 to conduct a classification current via the CLS input while the main power transistor M1, M2 is turned off. In certain operations, the controller IC 200 keeps the power transistor M1, M2 open or off until the VDD input voltage from a connected PSE 102 exceeds a predetermined undervoltage low threshold value UVLO, such as 35-40 volts in one example. In normal operation, if VDD then goes below the UVLO threshold, the controller 200 turns the power transistor M1, M2 off via the PSON signal.

The use of separate PD circuits 104 with a shared DC-DC converter 202 presents challenges in situations where one PD is operating and a second PD is connected to a PSE. These challenges are due to default PD and PSE operations designed for situations in which a single PD is associated with a corresponding DC-DC converter. For example, on startup, a PoE/PSE port performs inrush current limiting operation for a certain period of time, such as a current limit of 400-450 mA for a duration of 50-75 ms at port turn on as defined in the IEEE PoE specification. In addition, the corresponding PD controller 200 turns off the associated DC-DC converter during the inrush current limiting operation to allow the PSE to charge a bulk capacitor connected to the DC-DC converter input. During this time, the PD pulls a power good control signal PG down to ensure the downstream DC-DC converter is kept off until the bulk capacitor has been fully charged. In this manner, the bulk capacitor is slowly charged using the limited current from the PSE. Once precharging is completed, the DC-DC converter can perform a soft start when the PD releases the PG signal to allow DC-DC converter switching operation to drive the ultimate load. The current level during bulk capacitor charging operation is significantly lower than the current provided by a class 4 PD already operating at full load (ex: 25.5 W and up to 600 mA).

Although this current limiting operation works well in a system having a single PD driving the DC-DC converter, problems arise in a redundant PoE system using two or more PoE inputs and a single DC-DC converter. If a different PoE/PSE port is already providing power to the shared DC-DC converter, the inrush current limiting operation and the DC-DC converter turnoff operation of a PD controller associated with a subsequently powered PoE/PSE port can interfere with uninterrupted provision of power to a shared DC-DC converter. Inrush current for the PSE according to certain standards is limited to 400 mA. If the load is a class 4 load, e.g., 25 W, the 400 mA limited PSE cannot provide the required load. Moreover, if the second connected PoE/PSE port can provide a higher voltage (e.g., the second connected cable is much shorter with a voltage drop less than that of the previously connected cable, or where the voltage supply of the second PSE 102 is higher than the voltage of the first PSE 102), the second PoE/PSE port will also attempt to charge the bulk capacitor at the DC-DC converter input to the higher voltage level. During startup, however, the second PoE/PSE port is current limited to 400 mA, and may not be able to drive the load as well as charge the bulk capacitor during the current-limited operation, leading to shut off of the second PoE/PSE port. Subsequent retries to start the second PoE/PSE port will then result in the same initial current limited operation followed by shutdown. As a result, the first PD 104 will continue to be powered by the first PSE, but redundancy will never be achieved as the second PSE will never reach a steady-state powered on operating mode.

Referring also to FIGS. 4 and 5, another challenge relates to foldback operation of a newly connected PSE in a redundant PoE system. A PSE is generally allowed to apply foldback overcurrent protection during normal operation after the current-limited inrush period has completed, as defined in the IEEE PoE specification. A signal diagram 400 in FIG. 4 and a signal diagram 500 in FIG. 5 respectively show current limit curves 402 and 502 illustrating example current limits for a PSE 102 as a function of the low side PSE MOSFET drain-source voltage (VDS) of Q1 and Q2 in FIG. 1. The PSE controller 120 can implement voltage fold back operation in which the current is limited in order to protect Q1 and Q2 against overvoltage/overcurrent conditions. This operation prevents operation of the low side PSE power switches Q1 and Q2 at excessive instantaneous power levels above the curve 402 which varies as a function of the FET VDS. If a second PSE/PoE cable is connected to the PoE port of the second PD controller 200-2 while the first PD controller 200-1 is already operating, and the operating voltage level of the subsequently connected PSE/PoE port is higher than the current voltage across the bulk capacitor C5, the drain-source voltage of the PSE switches Q1 and Q2 may exceed the corresponding current limit curve 402 in FIG. 4. In this situation, the second PSE 102 will implement fold back action, and significantly limit the current supply according to the curve 402. One particularly problematic case is where the first PoE input charges the bulk capacitor to VDD=42.5V, while the second (most recently connected) PoE input is providing 57V through a short cable. This results in an almost 15V step seen as a drain-source voltage across Q1 and/or Q2 of the second PSE circuit 102, which may trigger the PSE foldback protection mechanism by the second PSE 102. This results in a much lower available current which can be lower than the PSE inrush limit, if the bulk capacitor recharge occurs during the operational mode. For example, the current limit enforced by the PSE controller 120 at 15 volts is about 350 mA in the example of FIG. 4 and is about 500 mA in the example of FIG. 5.

Referring now to FIGS. 1-3B, the system 100 in FIGS. 1 and 2 provides improved PD controllers 200 to address these challenges in a redundant PoE system. In particular, each of the PD controller ICs 200 in FIG. 2 includes a first output 221 to provide a first output signal PG to control operation of the DC-DC converter 202, as well as the second output 222 to provide a second output signal PSON to control the power transistor to selectively control current flow between the DC-DC converter 202 and the corresponding PSE 102. The second output 222 can be external as shown, or can be internal in other examples to operate an internal power transistor M1, M2. In addition, the controller ICs 200 include a first input 231 to receive a first input signal RED CONT having a first state (e.g., HI) and a second state (e.g., LO). The controller ICs 200 assess the state of the received first input signal to ascertain whether another PD circuit 104 is already operating to power the shared DC-DC converter circuit 202, and modified their startup actions accordingly. In particular, the PD controllers 200 operate in response to receiving the first input signal RED CONT in the second state (e.g., LO) indicating at least one of the other PD controllers 200 is in a powered state when the corresponding PSE 102 is connected to the first and second power inputs 118, 119 to refrain 306 from turning the DC-DC converter 202 off via the first output 221, and to wait for a predetermined non-zero time to allow an inrush current delay of the PSE 102 to complete before turning the power transistor M1, M2 on via the second output 222 to allow current flow between the DC-DC converter 202 and the PSE 102. In this manner, the most recently connected PD circuit 104 will not disturb the operation of the DC-DC converter 202, thus facilitating continuous powering of the load 206 while the recently connected PD circuit 104 is undergoing current-limited startup operation and the current-limited inrush control operation is done while the corresponding power transistor M1, M2 keeps the recently connected PD circuit 104 disconnected from the DC-DC converter 202. The controller ICs 200 also include a third output 223 (223-1 and 223-2 in FIG. 2) to provide a third output signal PWRD to indicate to the other PD controllers 200 that the PD controller 200 is in a powered state.

Figure 3A:
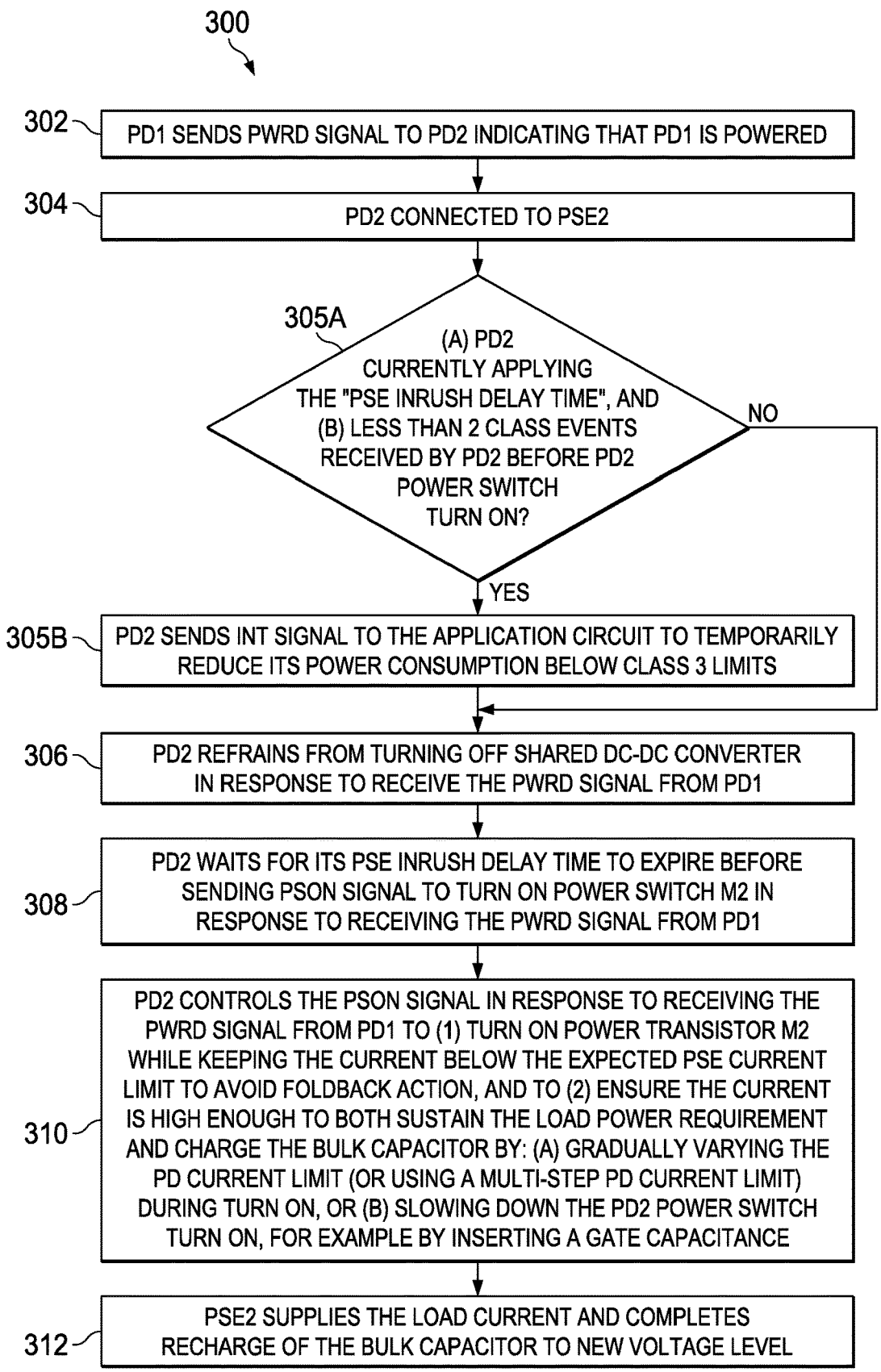
FIGS. 3A and 3B provide a flow diagram illustrating a method of operating a redundant PoE communication system.
Figure 3B:
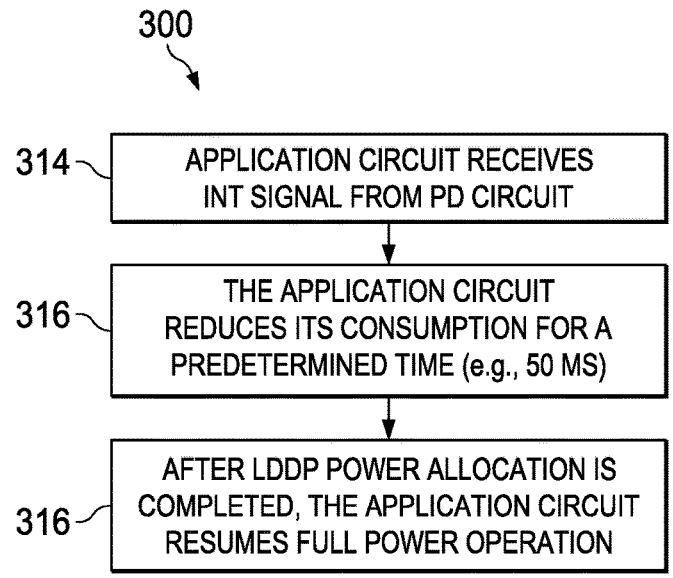

FIGS. 3A and 3B provide a flow diagram illustrating a method 300 to operate a redundant PoE communication system. In the following discussion, the operation of the PD controllers 200 is described in the context of initial operation with only PD1 104-1 powered and providing power to the input of the shared DC-DC converter circuit 202, where the second PD circuit 104-2 is then connected to its corresponding PSE circuit 102. The concepts of the present disclosure and the structure and functions of the PD controller ICs 200 provide corresponding operation where the second PD circuit 104-2 is initially powered and the first PD circuit 104-1 is then connected to its corresponding PSE circuit 102. At 302 in FIG. 3A, the first PD circuit 104-1 is currently in a powered state providing power to the input of the DC-DC converter 202, with its power transistor M1 turned on. The first PD controller IC 200-1 of the PD circuit 104-1 sends a PWRD signal on the output 223-1 to the second PD controller 200-2 in order to indicate that the first PD circuit 104-1 is in a powered state. As seen in FIG. 2, the first PD circuit 104-1 includes an optical coupler circuit 210 connected through a resistor R4 to the third output 223-1 to receive the PWRD signal from the first PD controller 200-1. The optical coupler 210 delivers a redundancy control input signal (e.g., a first input signal) to the RED CONT input 231-2 of PD2 to indicate to PD2 and any other PD(s) 104 that it (they) should have a different behavior when its (their) input power is applied (PSE2 connected to the PD2 via the PoE port 2).

At 304 in FIG. 3A, the second PD circuit 104-2 is connected to its corresponding PSE2 102. The second PD control circuit 200-2 determines at 305A whether the second PD circuit 104-2 is currently applying the PSE inrush delay time (e.g., the predetermined non-zero time), and if fewer than 2 class events were received by the second PD controller 200-2 before the power transistor M2 is turned on. If not (NO at 305A), the second PD controller 200-2 refrains from turning off the shared DC-DC converter at 306. Otherwise (YES at 305A), the second PD controller 200-2 sends an interrupt signal (INT) at 305B to the application circuit 206 requesting that the application circuit 206 temporarily reduces power consumption below the class 3 limits, and refrains from turning off the DC-DC converter at 306. Operation of the application circuit 206 in response to receiving an INT signal from the PD controller 200-2 is illustrated and described below in connection with FIG. 3B. Thus, because the first input signal was received at 302, the second PD controller 200-2 does not pull down the PG signal at its output 221-2. The PG signal would normally be pulled low and then released to initiate a soft start, but in this case the PD controller 200-2 does not pull its PG signal low. As a result, the DC-DC converter circuit 202 does not undergo a soft start operation, and continues providing power to the application circuit load 206. At 308 in FIG. 3A, the second PD controller 200-2 waits for its PSE inrush delay time to expire before sending the PSON signal at the second output 222-2 to turn on the power switch M2. This keeps the limited current operation of the corresponding second PSE2 separated from the DC-DC converter 202 and prevents the charging of the first capacitor C5 by the second PD circuit 104-2. In one example, the PD delay time (e.g., predetermined non-zero time) is approximately 75 ms minimum (e.g., to accommodate 50-70 ms PSE inrush time) to ensure adequate time for the corresponding newly connected PSE2 to complete its current-limited startup operation without disrupting operation of the shared DC-DC converter circuit 202. This delay the ensures that PSE2 is not performing its own inrush current limiting operation at the time when it is connected to the bulk capacitor C5 through M2, and thus PSE2 can provide enough current to charge the bulk capacitor C5 up to the higher voltage level.

At 310 in FIG. 3A, the second PD circuit 104-2 controls the PSON signal to control turn on of the power transistor M2 while keeping the current below the expected PSE current limit to avoid foldback action, as well as to ensure the current from PSE2 is high enough to both sustain the load power requirement and charge the bulk capacitor C5 if necessary. In certain examples, the turn on control is implemented by the controller IC 200-2 by controlling the voltage at the output 222-2 (e.g., the voltage level of the PSON signal) in order to implement a current limit during turn on of M2. In one example, the second PD controller 200-2 provides the second output signal PSON at 310 to control turn on of the power transistor M2 using a gradually varying a current limit. In another example, the second PD controller 200-2 provides the second output signal PSON to control turn on of the power transistor M2 using a multistep current limit at 310. In certain implementations, the second PD controller 200-2 provides a second output signal PSON at 310 so as to slowly turn on the power transistor M2. In one example, this is accomplished using the capacitor C7 connected to the gate of the power transistor M2 to slow M2. Controlling the turn on of M2 mitigates or avoids the possibility of foldback operation of the recently connected PSE2 by limiting the initial current from PSE2.

In this manner, the second PSE 102 is able to supply the load current and complete recharge of the bulk capacitor C5 to its new voltage level without causing the recently connected PSE2 102 to turn its switching transistors Q1 and/or Q2 off to implement fold back control. In these examples, the switch M2 is turned on slowly enough to avoid triggering the foldback control of PSE2, even where the voltage of PSE2 is higher than that of PSE1/PD1. In one example, this is done by using the normal PD controller current limiting features, such as the current sense input CS to assess the return current flowing into PSE2 while controlling the turn on of M2 (e.g., the same mechanism that PD2 would use if it were powering up as the only connected PD). In one example, the PD controller IC 200-2 employs its inrush current limiting circuitry with an upward ramp in the current limit value while transitioning to the powered state after waiting the predetermined time to avoid undesired triggering of the PSE foldback feature when the PSON signal indicates another PD/PSE (e.g., PD1/PSE1) is already operating to power a shared DC-DC converter in a redundant PoE system.

At 312 in FIG. 3A, the second PSE circuit 102 supplies load current and completes any required charging of the capacitor C5 to a new voltage level. Thereafter, the redundant system 100 continues providing power to the application circuit load 206 via the shared DC-DC converter circuit 202 with the converter 202 receiving input power from both the connected PD circuits 104-1 and 104-2. If another PD circuit is connected, similar operation is undertaken by the newly connected PD controller 200 as described above so as not to disturb the continued operation of the shared DC-DC converter and the previously powered PD circuits 104. Similar operation is undertaken for one of the PD circuits 104 that is subsequently disconnected and then re-connected to its corresponding PSE circuit 102. In this manner, the system 100 provides continuous uninterrupted power to the load 206 with the advantages of redundant PD circuits 104 delivering power to the input of the DC-DC converter 202. As previously mentioned, the PD circuits 100 for provide similar operation regardless of which circuit 104 is most recently connected to its corresponding PSE circuit 102. In this regard, the second PD circuit 104-2 includes an optical coupler 214 receiving an output signal PWRD from the output 223-2 of the second PD controller 200-2 through a resistor R9, and providing a redundancy control signal RED CONT to the input 231-1 of the first PD controller 200-1.

Referring now to FIGS. 1, 2, 3B and 6, further challenges are addressed by the system 100 in combining operation of multiple redundant PD circuits 104 with a single shared DC-DC converter circuit 202 delivering power to an application circuit load 206. In this regard, the PD controllers 200 in FIG. 2 further include a fourth output 224 to selectively provide a fourth output signal (e.g., interrupt signal INT described above at 305B in FIG. 3A) during the predetermined non-zero time in response to the PD controller 200 receiving the first input signal RED CONT in the second state LO, to request an application circuit 206 powered by the DC-DC converter 202 to temporarily reduce its power consumption below a predetermined value if the PSE 102 is configured to provide no more than the predetermined value of power. In certain examples, the PD controllers 200 release the fourth output signal INT after a predetermined period of time. The first PD circuit 104-1 includes an optical coupler 212 that receives the INT signal from the output 224-1 of the first PD controller 200-1 through a resistor R5. The optical coupler circuit 212 delivers an input signal to the MCU 208 of the application circuit 206. The second PD circuit 104-2 includes a similar optical coupler circuit 216 that receives the INT signal from the output 224-2 of the second PD controller 200-2 through a resistor R10. The optical coupler circuit 216 delivers a signal to the MCU 208. Once a requesting (e.g., newly connected) PD circuit 104 finishes the predetermined non-zero time during which the corresponding newly connected PSE circuit is starting up in current-limited mode, and the power supply has completed turn on, the MCU 208 of the application circuit 206 engages in negotiation with the newly connected PSE circuit (e.g., through the communication channels of the PoE system), and the requesting PD controller 200 releases or deactivates the fourth output signal INT after the application circuit 206 and the PSE 102 reconfigure the output power level of the PSE 102. In another example, the PD controller 200 activates the INT signal for a short predetermined time (e.g., during the 75 ms), and then releases the INT signal.

The most recent IEEE Std 802.3-2015 PoE standard includes 802.3at, sometimes referred to as PoE Plus, which provides for a Type 2 PSE circuit 102 to allocate class 3 level of power (13 W) through physical layer classification, to a PD 104 requesting 25.5 W. Such PSE initially begins at the lower power level (e.g., 13 W), and then proceeds through LLDP (link layer data protocol) communication using a data channel of the PoE system 100 and the associated Ethernet cable 106 to negotiate a higher power level to allow the PD 104 to reach 25.5 W. This process may take a very long time (e.g., several seconds) to be established. This is a problem where the PSE is the second (or other subsequent) PoE to be connected. If the application circuit 206 does not lower its power consumption during startup up of the new PSE 102, and the new PSE voltage is higher than the default level (e.g., higher than 13 W) while the previously operating PD1 104-1 is drawing 25.5 watts (a class 4 load) the newly connected PSE2 port will turn off due to an overcurrent fault, and the power redundancy will not be achieved.

As shown at 314 in FIG. 3B, the application circuit 206 receives the INT signal from the second PD controller 200-2 (at 305B in FIG. 3A if the conditions and 305A are met) requesting that the application circuit 206 temporarily reduce its power consumption below the class 3 limits. At 316, the application circuit 206 reduces its consumption within a predetermined time, such that the application circuit 206 has 50 ms to reduce its consumption in one example. At 318, after LDDP negotiation between the application circuit 206 and the newly connected PSE circuit 102, the PD controller 200-2 releases the INT signal and the application circuit 206 resumes full power operation.

Figure 7:
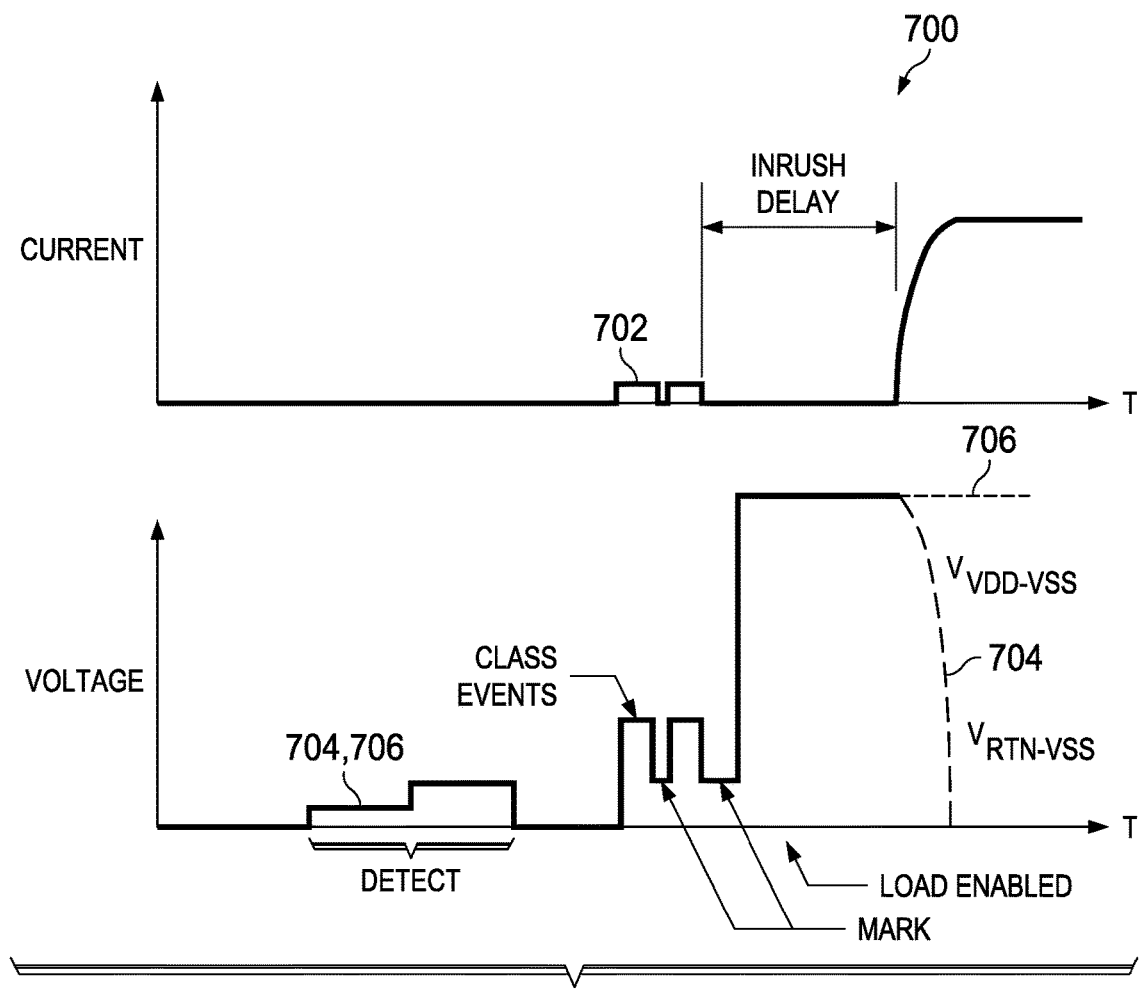
FIG. 7 is a signal diagram showing current and voltage signals between a PSE and a PD controller during initial connection for detection and classification in the redundant PoE communication system.

A signal diagram 700 in FIG. 7 illustrates detection and classification between the newly connected PSE circuit 102 and the second PD controller 200-2, including a current curve 702 and voltage curves 704 and 706. In the example of FIG. 7, two class events are received by the second PD circuit 104 from PSE2 prior to turn on of the corresponding power transistor M2. In particular, two class events or pulses in the current curve 702 or in the voltage curves 704, 706 on the class input CLS of the PD controller IC 200-2 indicate that the PSE2 is capable of providing 25 W of power. Receipt of only a single class event on the curves 702-706 instead indicates that the newly connected PSE2 102 can only provide 13 W, in which case the INT signal is asserted by the controller IC 200-2. When the PSE2 is doing classification, it pulses the switches Q1, Q2 between 15 and 20 V, and each time the voltage goes in that range, the PD circuit 104 will react by providing a current to indicate its classification level. The PSE 102 senses that current to determine the class of the PD circuit 104-2. These voltage and resulting current pulses appear as events shown in the signal diagram 700 of FIG. 7, allowing the PSE 102 and the PD 104-2 to identify the appropriate classification level. After the PSE classification voltage pulse or event, the PSE 102 sets the voltage to a "mark" range, such as 8 V in one example, in order to distinguish single from multiple classification pulses or events. After the appropriate number of classification events and "mark" spaces, the PSE controller 120-2 begins normal switching operation of Q1 and Q2 to deliver power through the cable 106 to the rectifier circuits 116. As shown in FIG. 7, the PSE controller 120 implements the inrush current operation during the 75 ms inrush delay of the PD controller 200-2 to provide voltage $V_{VDD-VSS}$ between the corresponding VDD and VSS lines 118-2 and 119-2 at the second PD controller 200-2. During this inrush current limiting operation, the current curve 702 remains at zero and a voltage $V_{VDD-VSS}$ (e.g., 55 V in one example) appears as shown in curve 706 in FIG. 7. After the inrush delay, the PD controller 200-2 asserts the PSON signal to turn on the power transistor M2 to connect the VSS line of the controller 200-2 with the RTN connection, illustrated by the $V_{RTN-VSS}$ curve 704 decreasing to essentially 0 V in FIG. 7, while the $V_{VDD-VSS}$ curve 706 continues according to the voltage supplied by the PSE 120.

The application circuit 206 then reduces its consumption within the next 50 ms or other suitable predetermined time. The second PD circuit 104-2 and the application circuit 206 then implement LDDP negotiation communications, and once the LDDP power allocation has been completed, the application circuit 206 resumes full power operation.

Figure 6:
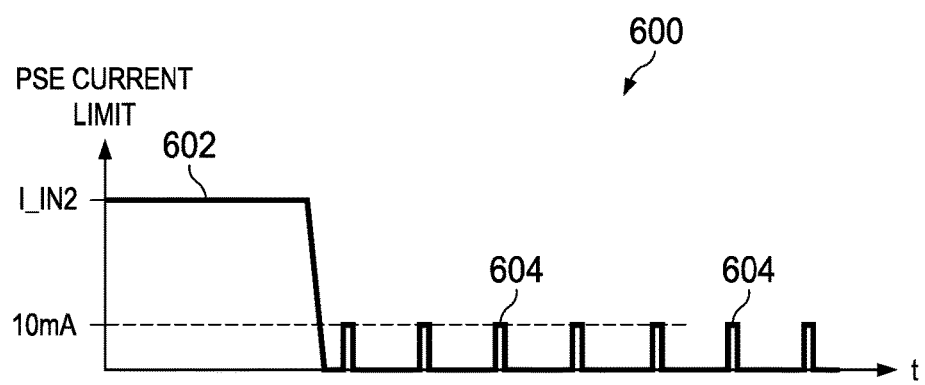
FIG. 6 is a signal diagram illustrating a PD input current curve with a steady state curve portion and pulses at a lower current level.

FIG. 6 provides a signal diagram 600 showing the input current I_IN2 flowing between PSE2 102-2 and the second PD controller IC 200-2, including a steady state curve portion 602, and several MPS pulses 604 at a lower current level (e.g., 10 mA). For example, if PD2 104-2 is operating (e.g., curve portion 602), and PD2 104-2 determines that it is at a lower voltage than the output from PD1 104-1, and thus that PD2 is not providing any power in the redundant system, PSE2 may perform a DC disconnect operation on the assumption that its cable 106 has been disconnected. To maintain operation of PSE2 at a certain minimum load through its connected cable, the PD2 controller IC 200-2 in one example implements the sequence of short low-level pulses 604 by operation of Q1 and Q2 in order to avoid improper DC disconnect operations by selectively connecting the AMPS CONT input to an internal circuit potential to conduct the current I_IN2 through a pulsed load resistor R8. This operation prevents or inhibits PSE2 from turning off by providing a dummy load to PSE2. In another example, the dummy load can be provided by a constant loading (e.g., not pulsed) in order to implement this function. In operation, the second PD controller IC 200-2 senses the current I_IN2 during normal operation, and if the current falls below a predetermined threshold value, the controller 200-2 implements the minimum power supply (MPS) pulses 604 in order to keep the PSE2 running to provide redundant power supply capability in the redundant PoE system.

The disclosed examples allow PoE redundancy while using a single 48V input DC-DC converter, and thus present space and cost saving advantages over the system of FIG. 8. In addition, the operation of the PD controllers 200 ensures no output power interruption any time a new PoE input is connected. Moreover, the system design is simplified by being independent of inrush constraints imposed by IEEE specifications on the PSE, and independent of PSE foldback protection during operational mode allowed by the IEEE specification. In addition, the disclosed systems and methods ensure full interoperability with PSE circuits 102 of any IEEE-compliant Type (1 to 4).

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. A powered device (PD) controller having a power input, a redundant PD input, a first output, and a second output, the power input adapted to be coupled to a power source equipment (PSE) via an Ethernet cable, the first output adapted to be coupled to a power converter, and the second output adapted to be coupled to a gate of a power transistor, the PD controller configured to:
   receive, at the redundant PD input, a powered state signal indicative of another PD controller coupled to the power converter, the another PD controller operating in a powered state; and
   in response to the powered state signal, wait for a delay time before producing a signal at the second output instructing the power transistor to turn on.

2. The PD controller of claim 1, wherein the delay time represents an inrush current delay of the PSE that is greater than zero.

3. The PD controller of claim 1, wherein the delay time approximates a duration for the PSE to complete an inrush current delay.

4. The PD controller of claim 3, wherein the delay time is approximately 75 milliseconds.

5. The PD controller of claim 4, wherein the delay time ranges between 50 milliseconds and 70 milliseconds.

6. The PD controller of claim 1, further configured to:
in response to the powered state signal, produce a signal at the first output instructing the power converter to avoid turning off.

7. The PD controller of claim 1, the PD controller having an interrupt output adapted to be coupled to an application circuit, the PD controller further configured to:
in response to the powered state signal and detecting a redundant delay time pending by the another PD controller, generate an interrupt signal at the interrupt output for reducing a power consumption of the application circuit below a class 3 level of an IEEE 802.3at standard.

8. The PD controller of claim 1, the PD controller having an interrupt output adapted to be coupled to an application circuit, the PD controller configured to:
in response to the powered state signal and detecting less than two class events requested from the application circuit, generate an interrupt signal for reducing a power consumption of the application circuit below a class 3 level of an IEEE 802.3at standard.

9. A system comprising:
a power converter;
a first powered device (PD) controller coupled to the power converter; and
a second PD controller having a power input, a redundant PD input, a first output, and a second output, the first output coupled to the power converter, the power input adapted to be coupled to a power source equipment (PSE) via an Ethernet cable, and the second output adapted to be coupled to a gate of a power transistor, the second PD controller configured to:
receive, at the redundant PD input, a powered state signal indicative of the first PD controller operating in a powered state; and
in response to the powered state signal, wait for a delay time before producing a signal at the second output instructing the power transistor to turn on.

10. The system of claim 9, wherein the delay time approximates a duration for the PSE to complete an inrush current delay.

11. The system of claim 9
wherein the power input is adapted to be coupled to a voltage input of a transformer.

12. The system of claim 9, wherein the first output is adapted to be coupled to a soft-start input of the power converter, and wherein the second PD controller is configured to:
in response to the powered state signal, produce a signal at the first output instructing the power converter to refrain from turning off,
wherein the first PD controller has a third output adapted to be coupled to the soft-start input of the power converter, the first PD controller configured to produce a signal at the third output instructing the power converter to turn on before sending the powered state signal to the redundant PD input of the second PD controller.

13. The system of claim 9, the second PD controller having an interrupt output adapted to be coupled to an application circuit, the second PD controller configured to:
in response to the powered state signal and detecting a redundant delay time pending by the first PD controller, generate, at the interrupt output, an interrupt signal for reducing a power consumption of the application circuit below a class 3 level of an IEEE 802.3at standard.

14. The system of claim 9, wherein the second PD controller has an interrupt output adapted to be coupled to an application circuit, the second PD controller configured to:
in response to the powered state signal and detecting less than two class events requested from the application circuit, generate an interrupt signal at the interrupt output for reducing a power consumption of the application circuit below a class 3 level of an IEEE 802.3at standard.

15. A powered device (PD) comprising:
a PD controller adapted to be coupled to a power converter, the PD controller configured to receive a powered state signal indicative of another PD controller coupled to the power converter operating in a powered state, and in response to the powered state signal, wait for an inrush current delay time before enabling a power transistor.

16. The PD of claim 15, wherein the PD controller has a power input adapted to be coupled to a power sourcing equipment (PSE) via an Ethernet cable, and a power start output adapted to be coupled to a soft-start input of the power converter, the PD controller further configured to:
in response to the powered state signal, produce a signal at the power start output instructing the power converter to refrain from turning off.

17. The PD of claim 15, wherein the PD controller has an interrupt output adapted to be coupled to an application circuit, the PD controller further configured to:
in response to the powered state signal and detecting a redundant delay time pending by the another PD controller, generate, at the interrupt output, an interrupt signal for reducing a power consumption of the application circuit below a class 3 level of an IEEE 802.3at standard.

18. The PD of claim 15, wherein the PD controller has an interrupt output adapted to be coupled to an application circuit, the PD controller further configured to:
in response to the powered state signal and detecting less than two class events requested from the application circuit, generate, at the interrupt output, an interrupt signal for reducing a power consumption of the application circuit below a class 3 level of an IEEE 802.3at standard.

* * * * *